Patented Jan. 13, 1931

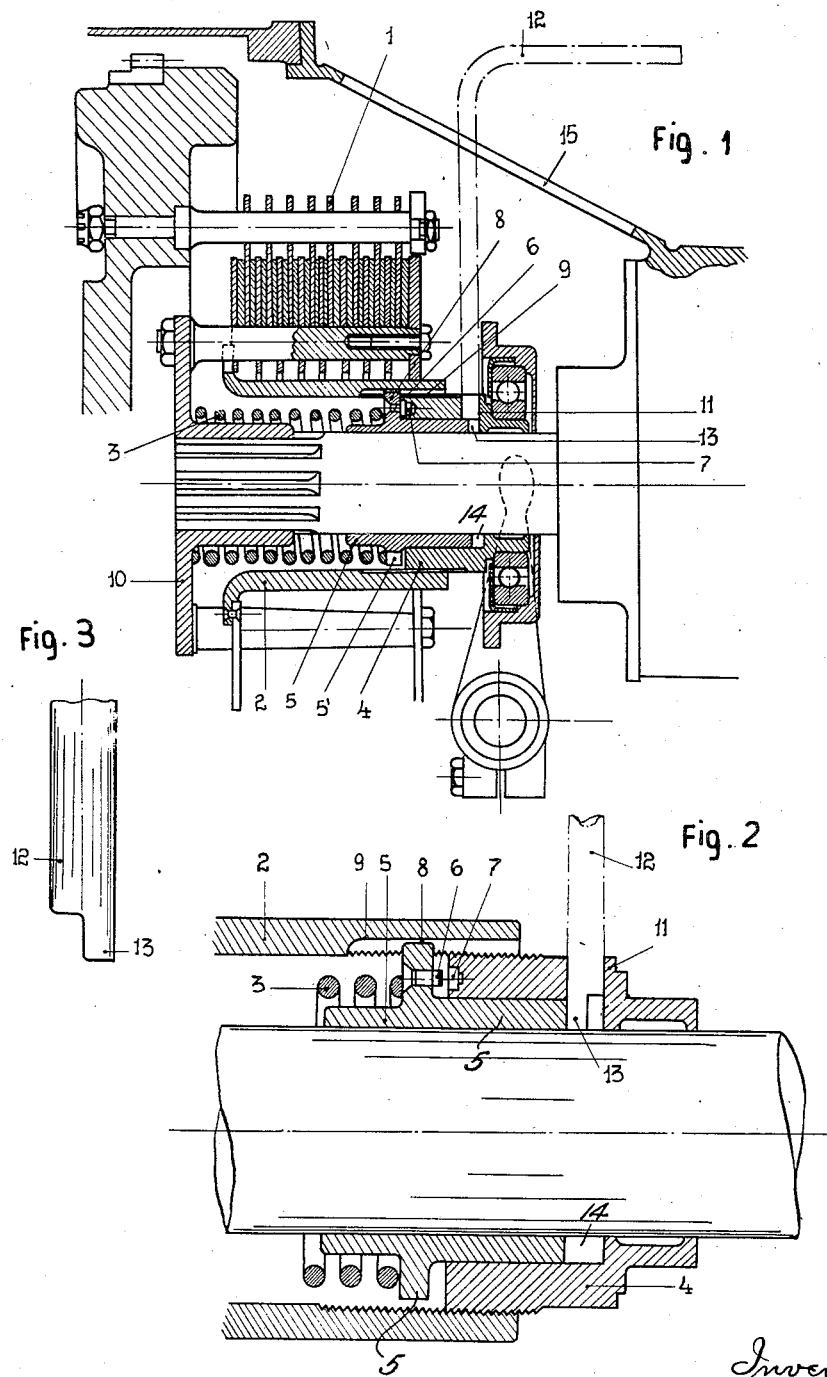

1,789,056

UNITED STATES PATENT OFFICE

VITTORIO VALLETTA, OF TURIN, ITALY, ASSIGNOR TO FIAT SOCIETÁ ANONIMA, OF TURIN, ITALY

CLUTCH

Application filed July 8, 1929, Serial No. 376,758, and in Italy May 22, 1929.

It is well known that one of the difficulties generally met in the upkeep of motor vehicles is the adjustment of the friction clutch coupling, particularly for the purpose of compensating the changes in tension of the spring acting on the friction elements, chiefly due to the wear of the friction surfaces.

This invention has for its object a central adjustment system for restoring by a simple and quick operation the tension of the spring of a friction clutch coupling to its predetermined value.

The device according to this invention consists substantially in providing the sleeve on which the tension spring is supported with another sleeve normally engaged with the first, from which however it may be disengaged by means of a suitable tool for adjusting the spring length thus compensating any possible change in its tension.

The annexed drawing shows by way of example a constructional form of the object of this invention embodied in a coupling of the multiple disc type.

Fig. 1 is a cross section through a vertical plane;

Fig. 2 is a similar section showing a detail on an enlarged scale;

Fig. 3 is a front elevation of the operative end of the adjusting tool.

Referring to the drawing, the friction discs 1 are held in contact by a hollow cylinder 2 pressed by a spiral spring 3. The hollow cylinder 2 at one of its ends carries a collar 4 screwed thereto and kept in the desired position relatively to the hollow cylinder 2 by a sleeve 5, which is provided with a shoulder 5' supporting the spring 3. Said annular shoulder is provided with projections 6 normally located in recesses 7 provided in corresponding points of the collar 4. The sleeve 5 is connected with the hollow cylinder 2 by means of one or more keys 8 engaging in axial grooves 9 on the hollow cylinder 2, in which said keys may be longitudinally displaced.

The compression spring 3 will be pressed between a face of the sleeve 10 fastened to the shaft and the sleeve 5 thus transmitting its pressure through the said sleeve 5 and collar 4 to the hollow cylinder 2.

A radial hole 11 is bored through the collar 4 near one end and the adjacent end 14 of the sleeve 5 projects partly over the hole when the collar and sleeve are in locked position as shown in Fig. 1. It will then be possible to pass through said hole 11 and behind the end 14 a special tool 12 having at its operative end (Fig. 3) an eccentric projection 13.

According to this invention the central adjustment of the spring length and therefore of its tension is effected in the following manner: The tool 12 is introduced into the hole 11 so as to cause the eccentric projection 13 to engage the projecting edge 14 of the sleeve 5. The tool 12 is then rotated through 180°; consequently the eccentric projection 13 moves the sleeve 5 longitudinally of the collar 4 (Fig. 2) and said movement causes the projections 6 to be set free from the recesses 7, so that the collar 4 and sleeve 5 will be disengaged. The collar 4 is then rotated by the tool 12 causing the collar by means of its threaded connection with the cylinder 2 to move axially of the latter in either direction according to the direction of rotation of the collar. While relative rotation between the sleeve 5 and cylinder 2 is prevented by means of the keys 8 on sleeve 5 engaging the axial grooves 9 of the cylinder 2, longitudinal movement of the sleeve 5 is controlled by the projection 13 engaging the end 14 of said sleeve thus increasing or reducing the length of the spring 3 as it is desired to increase or reduce the strength of the spring.

Once the tension has been adjusted, the spanner 12 is rotated backwards through 180° and by means of small angular movements of the collar 4 relatively to the sleeve 5 the collar and sleeve are again brought into engagement by means of the projections 6 and corresponding recesses 7.

The operation above described can be effected through the inspection opening 15 of the clutch housing and can therefore be easily and quickly performed even by unskilled operators.

It is well understood that the device above described and shown by way of example can be used in connection with any friction coupling and that the modifications required for different uses fall within the limits of this invention.

What I claim is:—

1. In a friction clutch coupling in combination with friction discs, a disc pressing hollow cylinder, a spring acting on said hollow cylinder, a sleeve interposed between one end of said spring and the hollow cylinder, and a collar screwed to one end of the hollow cylinder and co-operating with the sleeve to vary its position relatively to the disc pressing hollow cylinder.

2. In a friction clutch coupling in combination with friction discs, a disc pressing hollow cylinder, a spring acting on said hollow cylinder, a sleeve interposed between one end of said spring and the hollow cylinder, an annular shoulder on said sleeve, one face of said shoulder supporting said spring end, projections on the other face of said shoulder, a collar screwed to one end of the hollow cylinder and having recesses normally engaging said projections.

3. In a friction clutch coupling in combination with friction discs, a disc pressing hollow cylinder, a spring acting on said hollow cylinder, a sleeve interposed between one end of said spring and the hollow cylinder, an annular outer shoulder on said sleeve, one face of said shoulder supporting said spring end, peripheral keys on said shoulder engaging in longitudinal inner grooves of the hollow cylinder, projections on the other face of said shoulder, a collar screwed to one end of the hollow cylinder and having recesses normally engaging said projections and means for releasing from the outside said projections from said recesses in order to adjust the position of said collar relatively to the hollow cylinder.

4. In a friction clutch coupling, in combination with friction discs, a disc pressing hollow cylinder, a spring acting upon said hollow cylinder, a sleeve interposed between one end of said spring and the hollow cylinder, an annular outer shoulder on said sleeve, a face of said shoulder supporting said spring end, peripheral keys on said shoulder engaging longitudinal inner grooves of the hollow cylinder, projections on the other face of said shoulder, a collar screwed to one end of the hollow cylinder and having at one end recesses normally engaged by said projections and near its other end a radial hole over which the adjacent end of the sleeve extends when said projections engage said recesses said sleeve and collar being capable of axial displacement relatively to each other so as to release said projections from their recesses in order to permit rotation of the collar by introducing into said hole a suitable tool and rotating it through 180°.

In testimony that I claim the foregoing as my invention, I have signed my name.

VITTORIO VALLETTA.